United States Patent [19]
Nishikawa

[11] Patent Number: 5,418,602
[45] Date of Patent: May 23, 1995

[54] IMAGE PROCESSING WITH ANTI-FORGERY PROVISION

[75] Inventor: Eiichi Nishikawa, Machida, Japan

[73] Assignee: Canon Kabushiki Kaisha, Tokyo, Japan

[21] Appl. No.: 21,909

[22] Filed: Feb. 24, 1993

[30] Foreign Application Priority Data

Feb. 27, 1992 [JP] Japan .................................. 4-041034

[51] Int. Cl.$^6$ ............................................. G03G 21/00
[52] U.S. Cl. ..................... 355/201; 283/901; 283/902; 355/133
[58] Field of Search ............... 355/201, 133, 202, 244; 283/901, 902, 17, 73; 380/18, 51, 54, 55; 358/296, 450, 438, 440, 434

[56] References Cited

U.S. PATENT DOCUMENTS

| | | | |
|---|---|---|---|
| 4,310,180 | 1/1982 | Mowry, Jr. et al. | 355/133 X |
| 4,459,020 | 7/1984 | May et al. | 355/133 X |
| 4,579,370 | 4/1986 | Corwin et al. | 283/72 |
| 4,637,051 | 1/1987 | Clark | 380/51 X |
| 4,728,984 | 3/1988 | Daniele | 355/201 X |
| 4,739,377 | 4/1988 | Allen | 355/133 |
| 4,796,921 | 1/1989 | Neiman | 283/902 X |
| 4,956,666 | 9/1990 | Allen et al. | 355/202 |
| 5,216,724 | 6/1993 | Suzuki et al. | 382/7 |
| 5,227,871 | 7/1993 | Funada et al. | 358/75 |
| 5,231,663 | 7/1993 | Earl et al. | 380/18 |
| 5,257,119 | 10/1993 | Funada et al. | 358/438 |

FOREIGN PATENT DOCUMENTS

| | | |
|---|---|---|
| 342060 | 11/1989 | European Pat. Off. . |
| 3229616 | 2/1984 | Germany . |
| 0036873 | 3/1980 | Japan . |
| 0087380 | 5/1985 | Japan . |
| 0256980 | 10/1988 | Japan . |

Primary Examiner—Matthew S. Smith
Attorney, Agent, or Firm—Fitzpatrick, Cella, Harper & Scinto

[57] ABSTRACT

A discriminating circuit discriminates the degree of similarity between an image represented by an input image signal and a predetermined specific image. A CPU outputs a pattern-level selecting signal based upon the results of discrimination performed by the discriminating circuit. A pattern adding circuit modulates an internally stored specific pattern in accordance with an added-color designating signal and pattern-level selecting signal produced by the CPU, and adds the modulated specific pattern to the image signal. As a result, a pattern specific to the apparatus is added in a reliably identifiable manner to an image output having a high probability of containing the specific original. In the case of an image output having a low probability of containing the specific original, the specific pattern is added to this image output in such a manner that the picture quality thereof is not diminished by the added pattern.

19 Claims, 19 Drawing Sheets

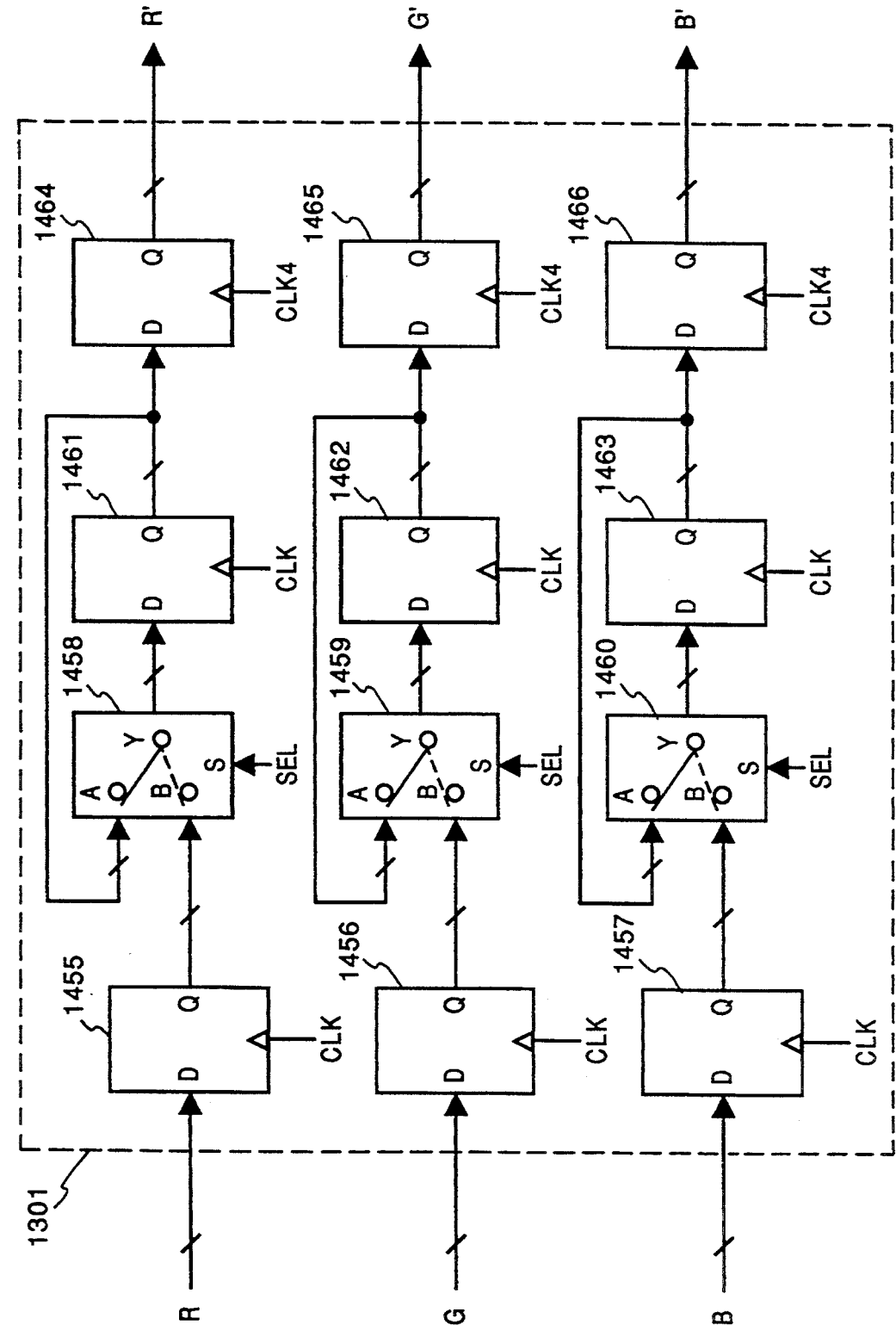

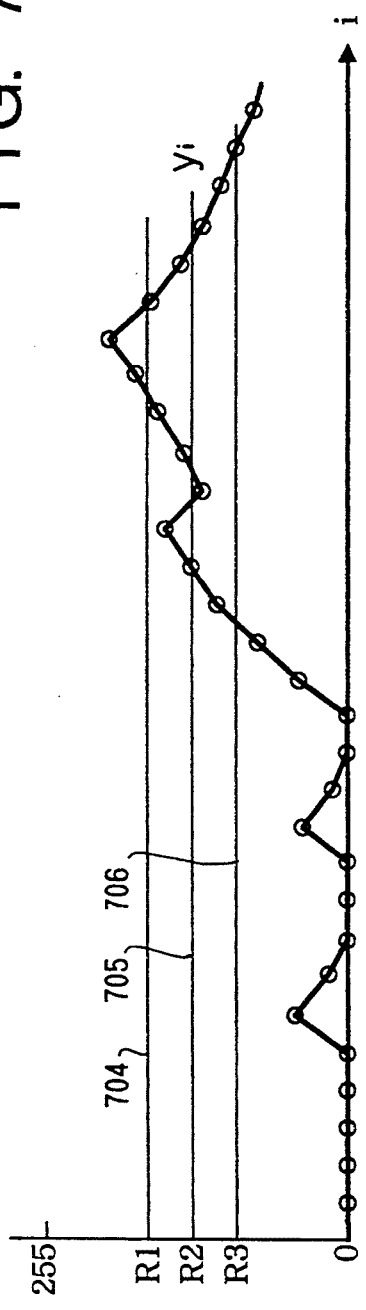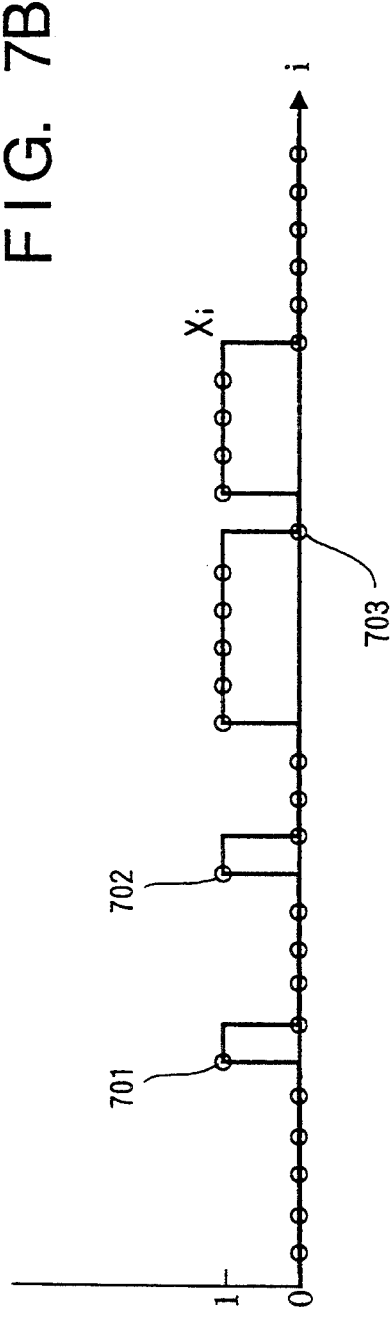

IMAGE PROCESSING WITH ANTI-FORGERY PROVISION

BACKGROUND OF THE INVENTION

1. Field of the Invention

This invention relates to an image processing apparatus and method, more particularly, to an image processing apparatus and method for adding a pattern, preferably one which is specific to a specific apparatus and method, to an image signal.

2. Description of the Related Art

Recent improvements in the picture quality of copying machines and the additional capability to produce color copies have made it possible to obtain copies that are almost indistinguishable from the originals. As a consequence, there is the danger that originals (hereinafter referred to as "specific originals") such as securities and bank notes whose copying is forbidden may be copied unlawfully and that such copies may be put to wrongful use.

If an unlawful copy has been produced, it is difficult with the prior-art techniques to identify, based upon the unlawful copy, the apparatus used to produce it as well as the individual that made the copy.

In order to prevent unlawful copying, attempts have been made to add a pattern (hereinafter referred to as a "specific pattern"), which is specific to the apparatus that produced the copy, to the copy, thereby making it possible to identify, from the unlawful copy itself, the apparatus used in its production as well as the individual that produced the copy.

However, certain problems are encountered in the prior art described above. Specifically, depending upon the image of a specific original or the color of the transfer material used, there are cases in which it is impossible to identify the specific pattern that has been added. In addition, there are cases in which the specific pattern is too conspicuous, thereby detracting from the picture quality of the image output.

SUMMARY OF THE INVENTION

Accordingly, an object of the present invention is to provide an image processing apparatus and method in which it is possible to add an identifiable specific pattern to a copy of a specific original, without any effect on the image of the specific original or the color of a transfer material used, and in which the picture quality of the image output is not diminished by the specific pattern added.

According to the present invention, the foregoing object is obtained by providing an image processing apparatus comprising input means for inputting an image signal, generating means for generating a specific pattern, adding means for adding the specific pattern generated by said generating means to the image signal, and control means for generating a control signal for selecting a color of the specific pattern.

In a preferred embodiment, the adding means controls the color, density or brightness of the specific pattern.

In another aspect of the present invention, the foregoing object is obtained by providing an image processing apparatus having image reading means for optically reading an original and obtaining a color-separated full-color input image signal, and image output means for outputting a processed image signal, the apparatus comprising discriminating means for discriminating the degree of similarity between an image represented by the image signal and a predetermined specific image, memory means for storing a specific pattern, modulating means for modulating the specific pattern stored in the memory means, in dependence upon results of discrimination performed by the discriminating means, and adding means for adding the specific pattern, as modulated by the modulating means, to the image signal.

In a preferred embodiment, the modulating means controls color of the specific pattern in dependence upon the transfer material of the image output means or upon the color of a developing agent.

In a preferred embodiment, the specific pattern includes a number or other symbol specific to an apparatus or a date of manufacture of the apparatus, and is added repeatedly at a fixed interval in the copied image.

In a preferred embodiment, the fixed interval is smaller than the longitudinal and transverse dimensions of the specific image.

In accordance with the invention as described above, an image processing apparatus and method that adds on a specific pattern in appropriate fashion can be provided. With the image processing apparatus and method of the invention, it is possible to add an identifiable specific pattern to a copy of a specific original without any effect on the image of the specific original or the color of a transfer material used, and the picture quality of the image output is not diminished by the specific pattern added.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 4A and 4B are block diagrams showing the configurations of a thinning-out circuit and frequency dividing circuit according to this embodiment;

FIGS. 7A and 7B are diagrams showing an example of input/output of the integrator of FIG. 6;

DESCRIPTION OF THE PREFERRED EMBODIMENTS

Embodiments of the present invention will now be described in detail with reference to the drawings.

In the embodiments that follow, a copying machine is illustrated as an example of application of the invention. However, the present invention is not limited to a copying machine but can be applied also to other devices such as a printer or printer interface without departing from the scope of the claims. Further, the specific original is assumed to cover not only originals such as bank notes and securities the copying of which is forbidden by law but also originals having a specific use that makes it desirable to prevent their unauthorized copying, such as confidential documents.

First Embodiment

[Overview of Apparatus]

Figure 1:
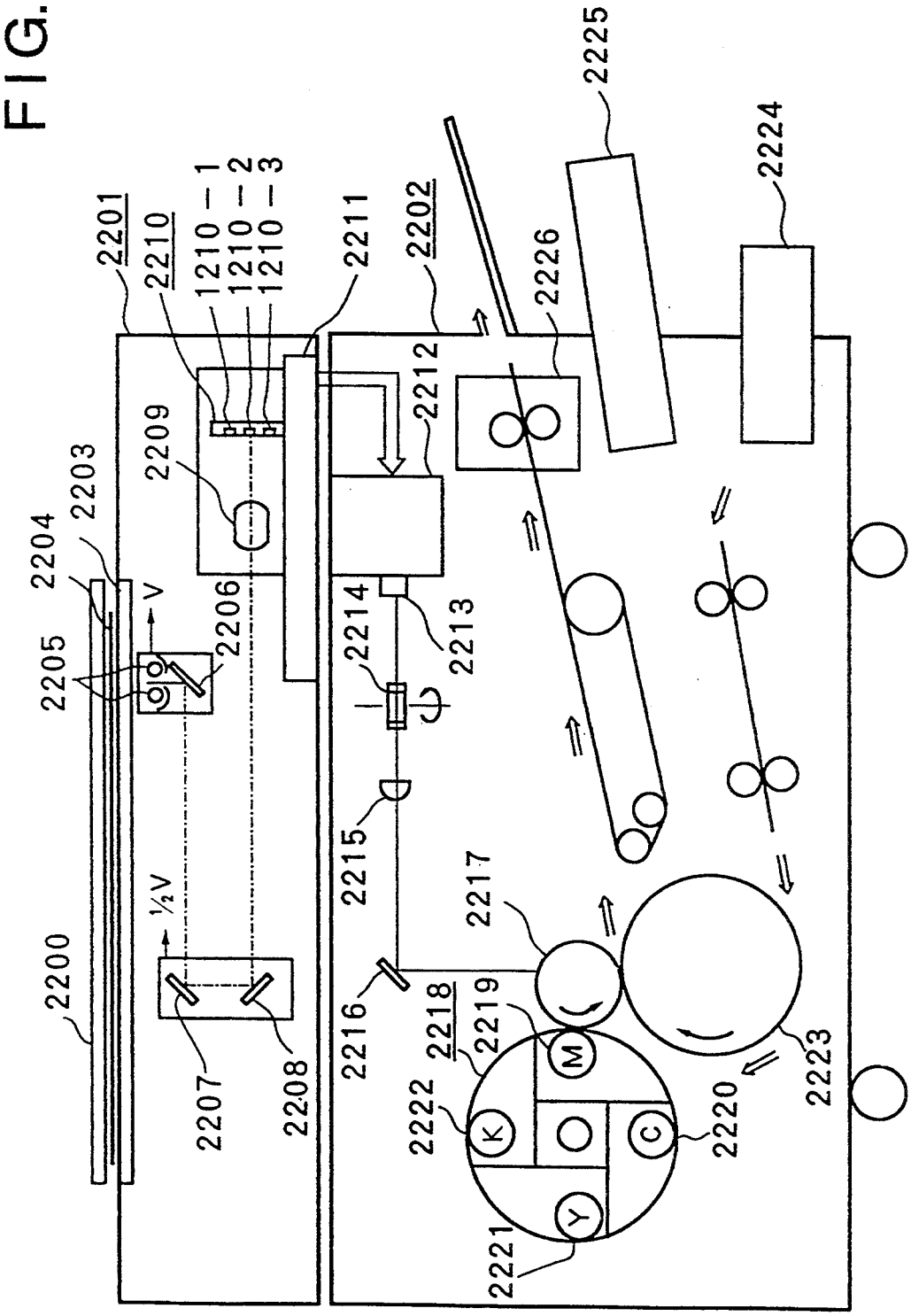
FIG. 1 is an external view illustrating an embodiment of the present invention.

FIG. 1 is an external view showing an apparatus according to a first embodiment of the present invention.

In FIG. 1, numeral 2201 denotes an image scanner section for reading an original at a resolution of 400 dpi (dots/inch) and performing digital signal processing. Numeral 2202 designates a printer for printing out an image, which corresponds to the original image read by the scanning selector 2201, on recording paper in full color.

The image scanner 2201 includes a platen 2200 and a glass platform 2203 for originals. An originals 2204 sandwiched between the platen 2200 and the glass platform 2203 is irradiated by means of lamps 2205, the light reflected from the original 2204 is introduced to mirrors 2206~2208 and an image is formed on a three-line sensor 2210 by a lens 2209. The three-line sensor 2210 separates the reflected light from the original 2204 into the components red (R), green (G) and blue (B), which together represent full-color information, and sends these components to an image processor 2211 as signals representing the respective light intensities. The entire surface of the original is scanned (sub-scanning) by mechanically moving the lamps 2205 and mirror 2206 at a velocity V as well as the mirrors 2207, 2208 at a velocity V/2 in a direction perpendicular to the electrical scanning direction (main-scanning direction) of the three-line sensor 2210.

The signal processor 2211 electrically processes the input image signal, separates the signal into magenta (M), cyan (C), yellow (Y) and black (K) components and sends these components to the printer 2202. At least one component among the M, C, Y, K components is sent to the printer 2202 per scan of the original in the image scanner 2201, and a single image output is completed by a total of four scans of the original.

It should be noted that the image processor 2211 may be so adapted that the input image signal is first stored in an image memory, after which it is electrically processed and separated into the magenta (M), cyan (C), yellow (Y) and black (K) components, which are then sent to the printer 2202. In such case, a readout operation would be performed in the image scanner 2201 four times with regard to image data read in by a single scan of the original, one component among the M, C, Y, K components would be produced by image processing each time, and the component would be sent to the printer 2202. A single image output would be completed by a total of four reading and processing cycles.

The M, C, Y, K image signals successively received as inputs from the image scanner 2201 are sent to a laser driver 2212. The laser driver 2212 modulates and drives a semiconductor laser 2213 in dependence upon the particular image signal sent. The laser light emitted by the semiconductor laser 2213 is made to scan across a photosensitive drum 2217 via a polygonal mirror 2214, an f-$\theta$ lens 2215 and a mirror 2216, thereby forming an electrostatic latent image.

Numeral 2218 denotes a revolving developer comprising a magenta developing section 2219, a cyan developing section 2220, a yellow developing section 2221 and a black developing section 2222. These four developers come into alternate contact with the photosensitive drum 2217 so that the electrostatic latent image formed on the photosensitive drum 2217 is developed by means of toners.

Numeral 2223 denotes a transfer drum upon which recording paper fed from a paper cassette 2224 or 2225 is wound so that the image developed on the photosensitive drum 2217 may be transferred to the recording paper.

After the four colors M, C, Y, K have thus been transferred successively, the recording paper is passed through a fixing unit 2226 to fix the toners on the paper, after which the paper is ejected.

[Image Scanner]

Figure 2:
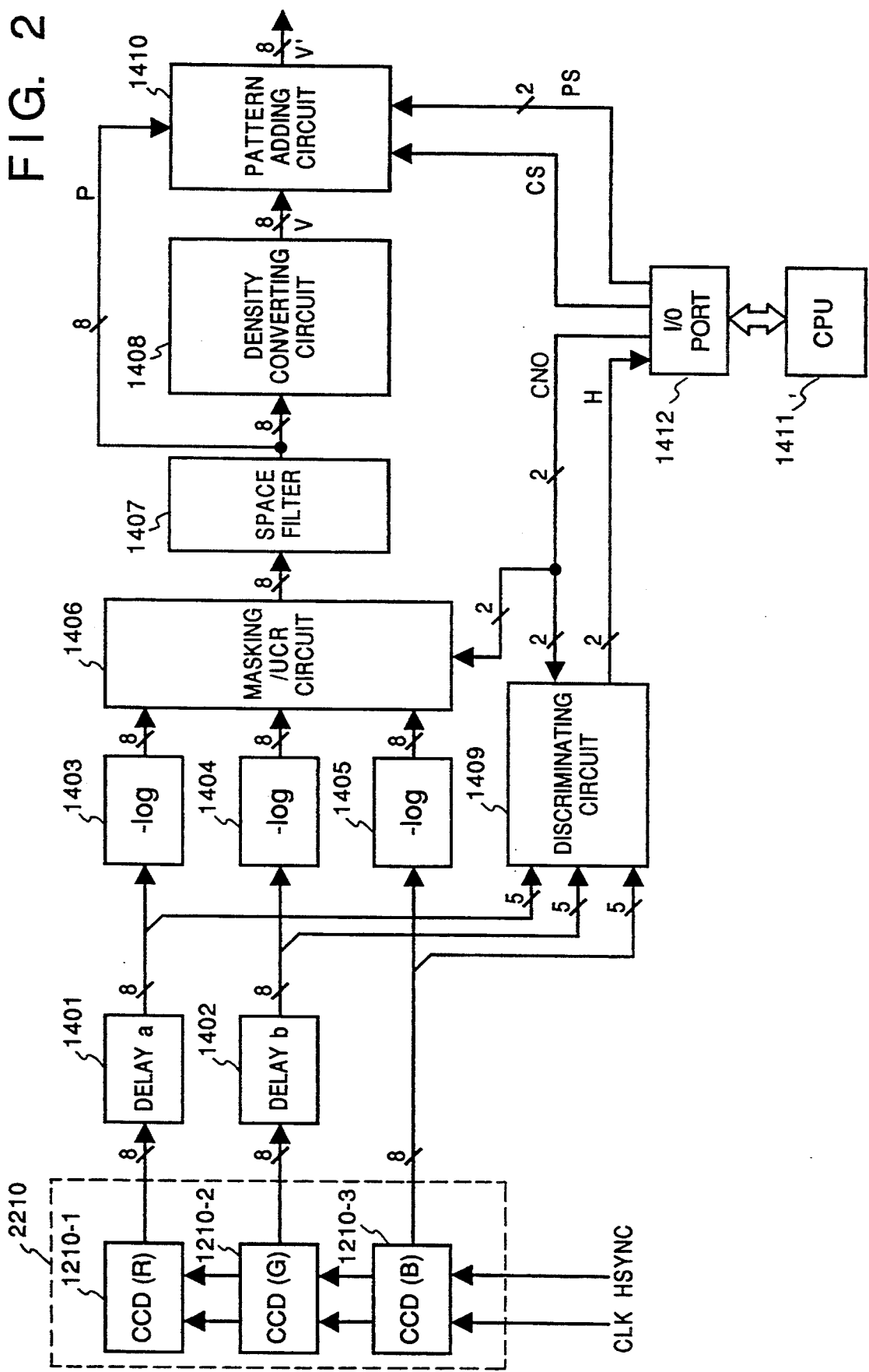
FIG. 2 is a block diagram illustrating the configuration of an image scanner according to this embodiment.

FIG. 2 is a block diagram showing the construction of the image scanner 2201.

Numerals 1210-1, 1210-2, 1210-3 in FIG. 2 denote CCD sensors (solid-state image sensing devices) having spectral sensitivity characteristics for R, G and B, respectively. These CCD sensors are incorporated within three-line sensor chip 2210 shown in FIG. 1, and each outputs an eight-bit image signal that has been subjected to an A/D conversion. Accordingly, the colors R, G, B are each subdivided into levels of 0~255 depending upon their respective light intensities.

Since the CCD's 1210-1, 1210-2, 1210-3 are arranged so as to be spaced apart a fixed distance, a displacement in terms of time is corrected for, using delay elements 1401 and 1402.

Numerals 1403~1405 are log converters constituted by a look-up table ROM or RAM for converting the image signals, which have been sent from the three-line sensor 2210, from luminance signal into density signals. Numeral 1406 denotes a well-known masking/UCR (undercolor removal) circuit. Though a detailed description is omitted, each of the M, C, Y, K signals for image output obtained from the three inputted signals are outputted at a prescribed bit length (eight bits) in field-sequential fashion whenever there is a reading operation.

Numeral 1407 denotes a well-known space filter circuit which corrects the space-frequency of the output signal the circuit 1406. Numeral 1408 denotes a density converting circuit for correcting for the density characteristics of the printer 2202. Like the log converters 1403~1405, this circuit is constituted by a ROM or RAM look-up table.

Numeral 1409 designates a discriminating circuit. Though the details will be described later, this circuit judges the possibility that image data currently being read in contains image data indicative of a specific original, and outputs the result of its judgment as a two-bit decision signal H. More specifically, the discriminating circuit 1409 outputs a signal indicative of H="11" when it is most likely that at least one specific original from among a plurality thereof is contained in what is currently being read in, and outputs a signal indicative of H="00" when the foregoing is least likely to hold.

Numeral 1410 denotes a pattern adding circuit for adding a specific pattern to an output image.

Numeral 1411 denotes a CPU for supervising control of the apparatus, and numeral 1412 denotes an input-/output port connected to the CPU 1411.

Though the details will be described later, the pattern adding circuit 1410 changes pattern addition processing in conformity with a two-bit pattern-level selection signal PS and a one-bit added-color designating signal CS, which are outputted by the CPU 1411. Further, the specific pattern added is formed from an image signal P.

A CNO signal separately inputted to the masking-/UCR circuit 1406 is a two-bit output-color selecting signal illustrated in Table 1 below. This signal, which is produced by the CPU 1411 and entered via the I/O port 1412, controls the order of four cycles of image transfer operations and changes over the operating conditions of the masking/UCR circuit 1406.

TABLE 1

| CNO | PRINT OUTPUT | |
| --- | --- | --- |
| 0 | MAGENTA | (M) |
| 1 | CYAN | (C) |
| 2 | YELLOW | (Y) |
| 3 | BLACK | (K) |

[Timing Chart]

Figure 3:
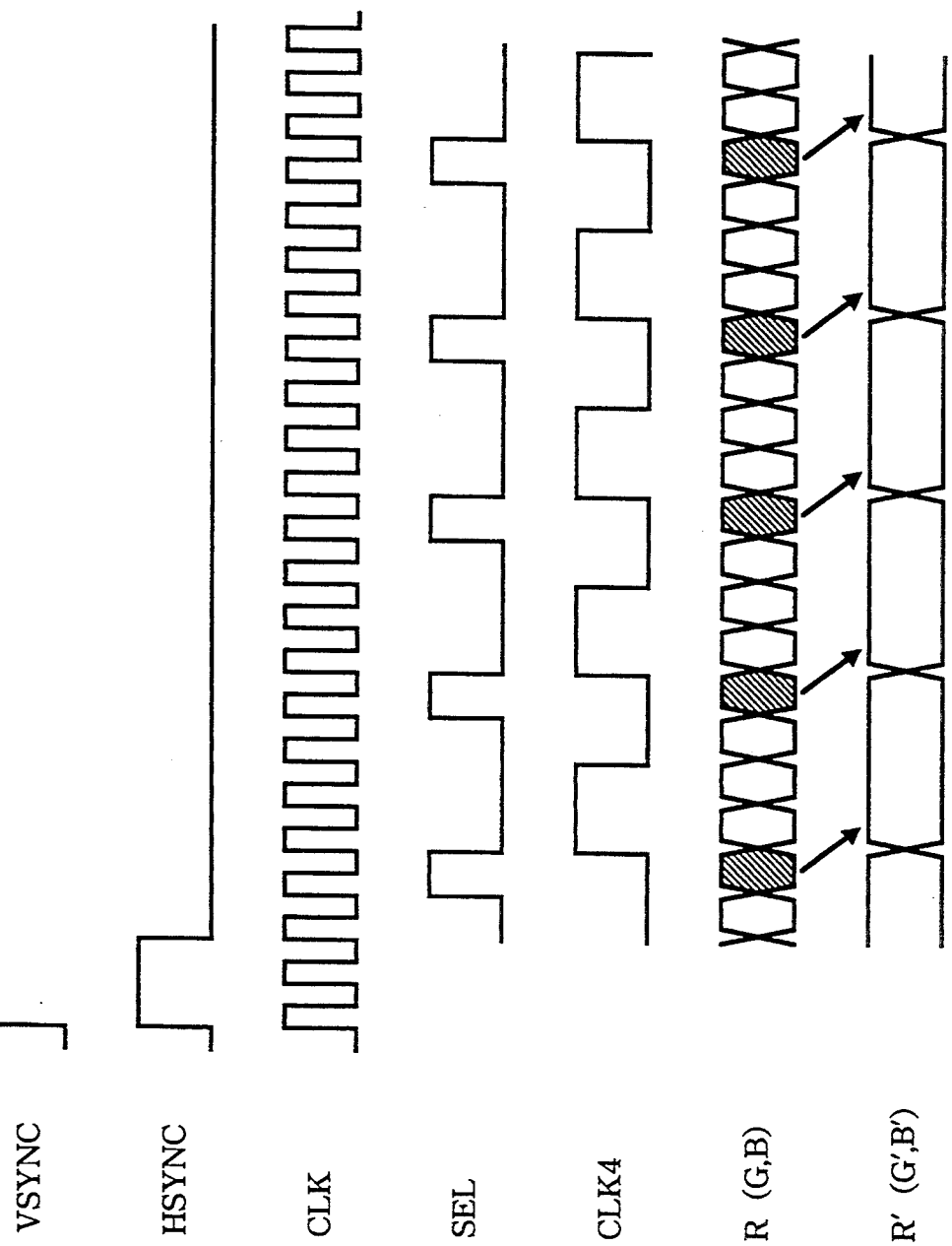
FIG. 3 is a timing chart of main scanning according to this embodiment.

FIG. 3 is a timing chart of main scanning according to this embodiment.

In FIG. 3, VSYNC represents a sub-scan synchronizing signal interval signal, namely a signal that indicates the image output interval of a sub-scan, and HSYNC represents a main-scan synchronizing signal for achieving synchronization with the start of main scanning. CLK is a pixel synchronizing signal which, in this embodiment, is the basic clock of a variety of image processing operations.

CLK4 represents a clock obtained by frequency division of the CLK signal by four. This serves as the basic clock in the discriminating circuit 1409. A SEL signal is a timing signal used in a thinning-out circuit 1301 illustrated in FIG. 4A.

Figure 4B:
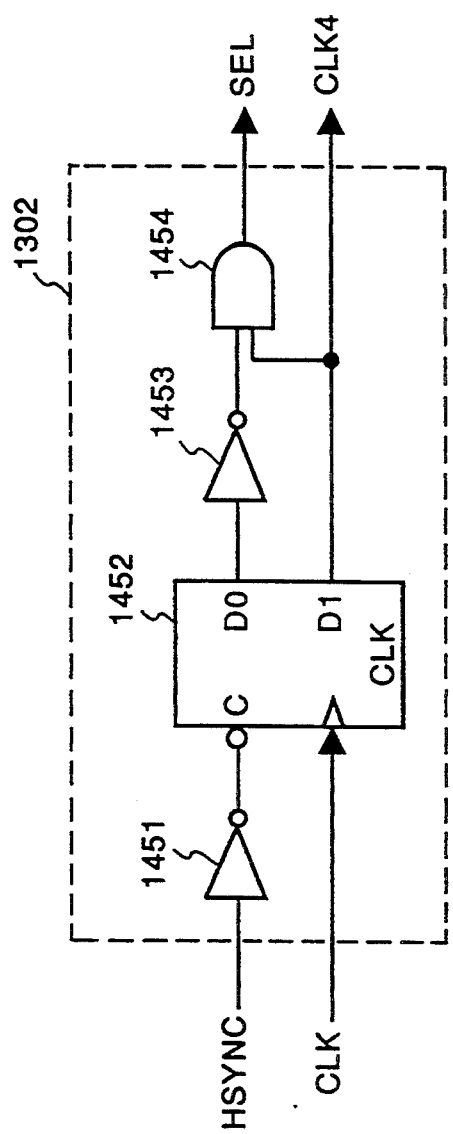

The signals CLK4 and SEL are produced by a frequency dividing circuit 1302, the construction of which is shown in FIG. 4B. Specifically, the frequency dividing circuit 1302 is constituted by an inverter 1451, a two-bit counter 1452, an inverter 1453 and an AND gate 1454, as illustrated in FIG. 4B. After being cleared (initialized) by the HSYNC signal, the two-bit counter 1452 counts the CLK signal and outputs the counted value in the form of two bits. The higher order bit D1 of the counter is outputted as the CLK4 signal, and the result of taking the AND between the higher order bit D1 and a signal obtained by inverting the lower order bit D0 of the counter is outputted as the SEL signal.

The thinning-out circuit 1301 whose construction is shown in FIG. 4a comprises flip-flops (F/F's) 1455~1457, 1461~1463, which hold data in response to the CLK signal, selectors 1458~1460, and F/F's 1464~1466 that hold data in response the CLK4 signal. In accordance with the thinning-out circuit 1301, an R' (or G', B') signal synchronized to CLK4 can be extracted, at a ratio of ¼, from the R (or G, B) signal transferred by the CLK signal, as shown in FIG. 3, by way of example.

[Discriminating Means]

Figure 5:
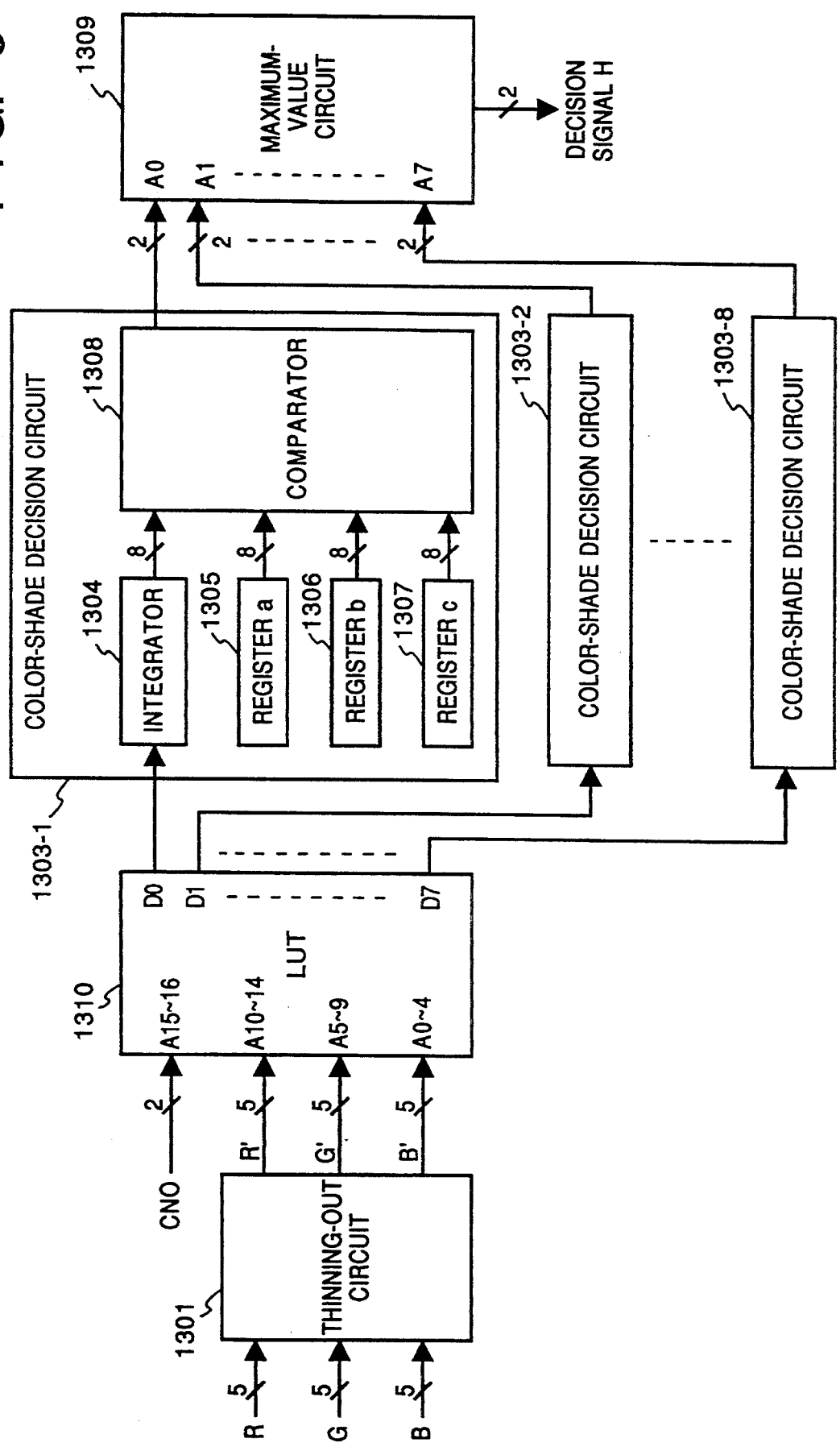
FIG. 5 is a block diagram showing the configuration of a discriminating circuit in FIG. 2.

FIG. 5 is a block diagram illustrating the construction of the discriminating circuit 1409.

In FIG. 5, numeral 1301 denotes the thinning-out circuit, an example of which is shown in FIG. 4A. In order to lighten the processing load of the discriminating circuit 1409, five higher order bits of each of the input image signals RGB are applied to the thinning-out circuit 1301, which outputs image signals R'G'B' obtained by thinning out part of the data of the input image signals.

Numeral 1310 denotes a look-up table (hereinafter referred to as a "LUT"), which is constituted by a ROM, for color-matching an input image and the images of a plurality of types of specific originals. The distribution of the shades of color regarding eight types of specific originals is investigated in advance. Based on the results, discrimination information is obtained for determining whether the color shade of an input image coincides with the color shade of a specific original. This information is stored in the LUT 1310.

The output-color selecting signal CNO is inputted to the LUT 1310 as the two higher order address bits (A16, A15) thereof, and the five bits of each of the image signals R'G'B' outputted by the thinning-out circuit 1301 are inputted to the 15 lower order bits (A14~A0) of the LUT 1310.

In conformity with the output-color selecting signal CNO, a signal indicating whether or not the shades of color of relevant pixels agree with the shades of color in eight types of specific originals, is outputted by the LUT 1310 simultaneously in correspondence with eight bits of data (D7~D0). In the four transfer operations, a total of 32 types of specific originals are judged.

Numerals 1303-1~1303-8 denote color-shade judging circuits, each of which is composed of identical hardware, namely an integrator 1304, registers 1305~1307 and a comparator 1308. Each bit of the eight-bit results of judgment outputted by the LUT 1310 enters a respective one of the color shade judging circuits 1303-1~1303-8, which proceeds to output, in the form of a two-bit signal, the possibility that the image of a specific original is contained in the input image.

Numeral 1309 designates a maximum-value circuit for outputting the maximum value of the results of judgment from the color-shade judging circuits 1303-1~1303-8. That is, the maximum-value circuit 1309 outputs a decision value indicating a specific original, from among the plurality thereof, most likely to be present in the input image.

[Integrator]

Figure 6:
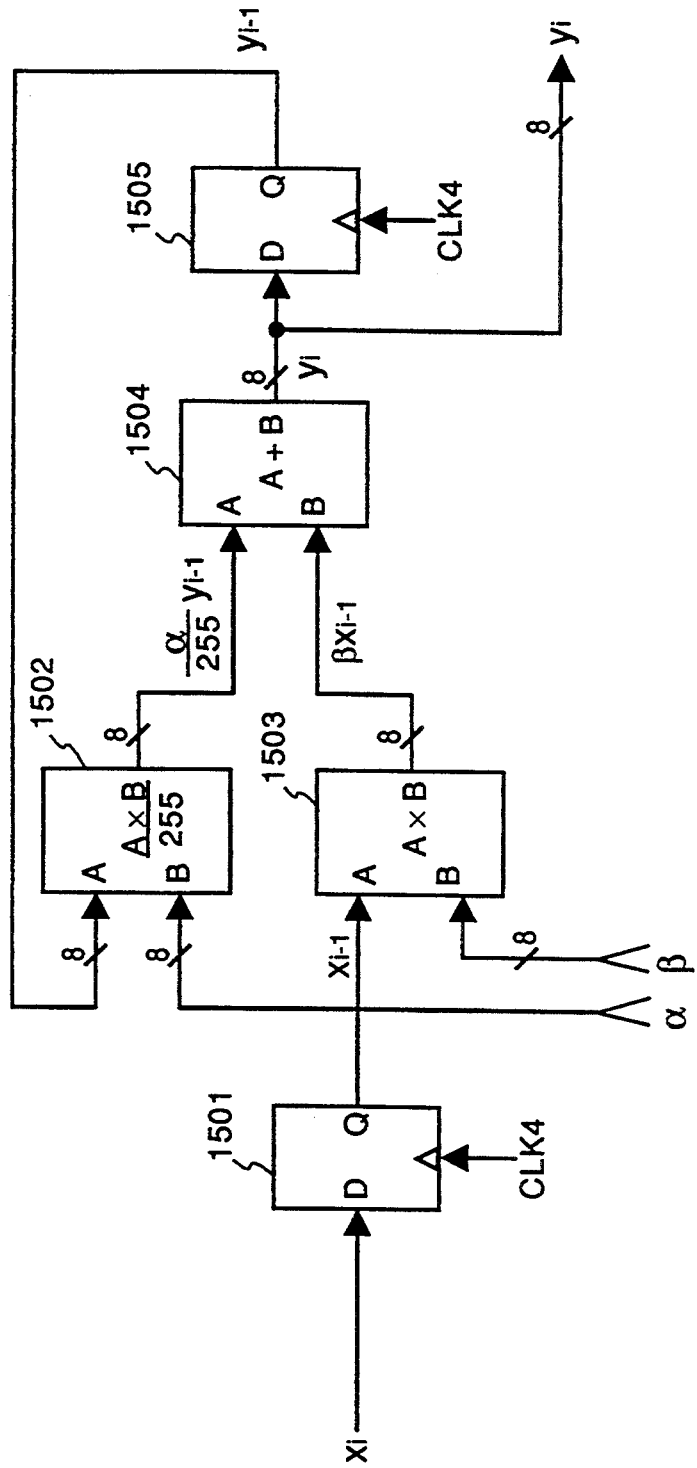
FIG. 6 is a block diagram showing the configuration of an integrator in FIG. 5.

FIG. 6 is a block diagram showing the construction of the integrator 1304.

In FIG. 6, numerals 1501, 1505 denote F/F's that hold data at the timing of the leading edge of CLK4. Numeral 1502 denotes a multiplier to which two eight-bit signals (A, B) are inputted. The multiplier 1502 multiplies these signals together and outputs an eight-bit bit signal (A×B/255) as the result. Numeral 1503 denotes a multiplier to which a one-bit input signal (A) and an eight-bit input signal (B) are applied. The multiplier 1503 multiplies these signals together and outputs an eight-bit signal (A×B) as the result.

Numeral 1504 denotes an adder to which two eight-bit signals (A, B) are inputted. The adder 1504 adds these signals together and outputs an eight-bit signal (A+B) as the result.

Accordingly, the relationship between a two-valued input signal $x_i$ of the integrator 1304 and an eight-bit output signal $y_i$ thereof is expressed by the following equation:

$$y_i = (\alpha/255) \cdot y_{i-1} + \beta \cdot x_{i-1} \tag{1}$$

where $\alpha$ and $\beta$ represent constants that have been preset. The various characteristics of the integrator 1304 are decided by the sizes of these values.

For instance, FIG. 7 illustrates an example of input/output of the integrator 1304 in a case where $\alpha=247$ and $\beta=8$. That is, a signal $y_i$ of the kind shown in FIG. 7A is outputted in response to an input signal $x_i$ of the kind shown in FIG. 7B.

In FIG. 7B, an input signal $x_i$ of "1" regardless of the fact that values on either side thereof are almost "0", as at points 701, 702, and an input signal $x_i$ of "0" regardless of the fact that values on either side thereof are almost "1", as at point 703, may be considered to be noise. This is processed by the integrator. Appropriate threshold values such as R1~R3, examples of which are shown at 704~706 in FIG. 7A, are set respectively in the registers 1305~1307, and the signal $y_i$, which is the result of integrating the input signal $x_i$ in integrator 1304, is binarized by the comparator 1308, thereby making it possible to eliminate noise.

[Comparator Module]

Figure 8:
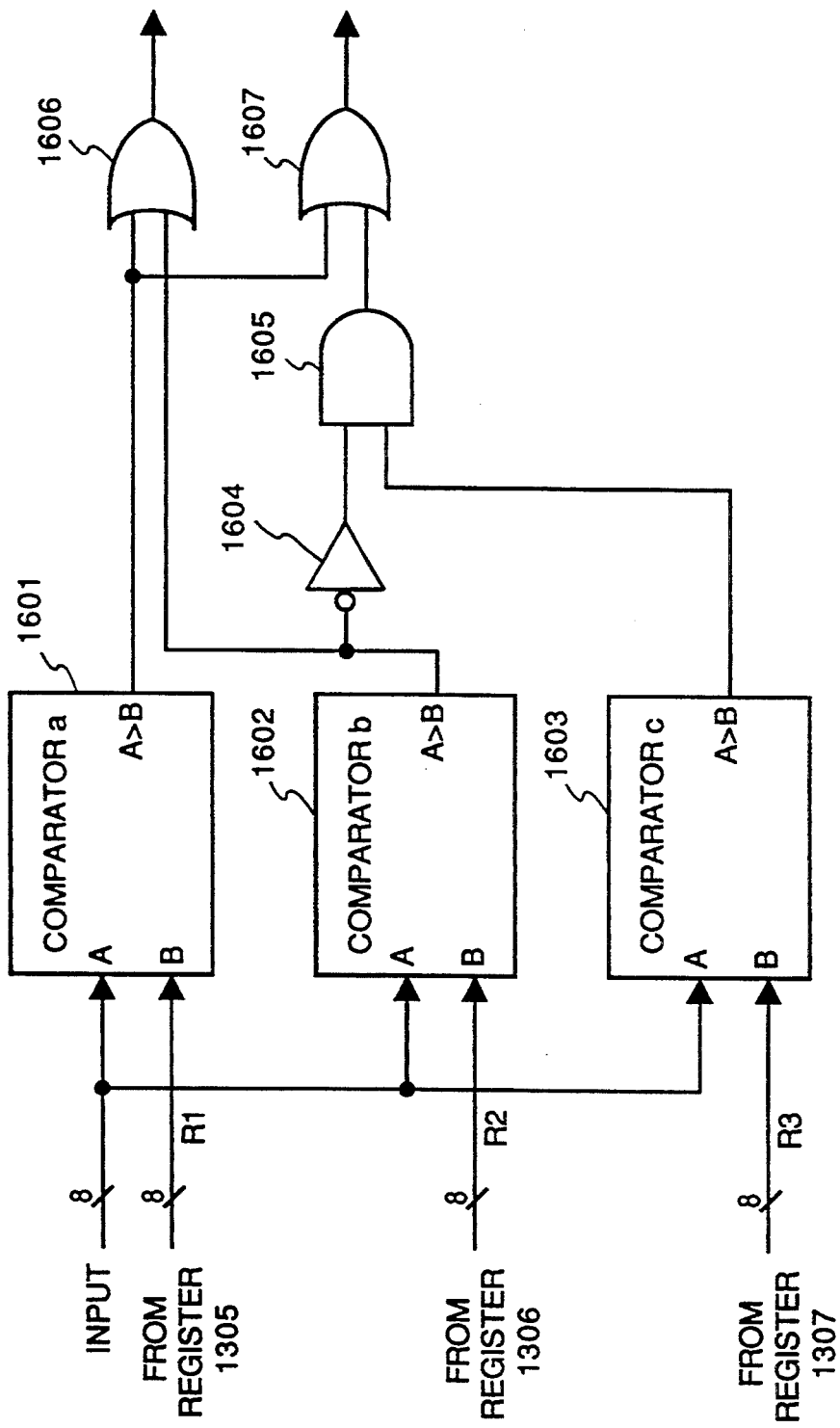
FIG. 8 is a block diagram showing the configuration of a comparator in FIG. 5.

FIG. 8 is a block diagram showing the construction of the comparator 1308.

In FIG. 8, 1601~1603 denote comparators, 1604 an inverter, 1605 an AND gate, and 1606, 1607 OR gates. The threshold values R1, R2, R3, which are related by the inequality R1>R2>R3, are set in the registers 1305, 1306, 1307, respectively.

More specifically, the comparator 1308 delivers "11" when R1<INPUT holds; "10" when R2<INPUT≦R1 holds; "01" when R3<INPUT≦R2 holds; and "00" when INPUT≦R3 holds.

[Pattern Adding Circuit]

Figure 9:
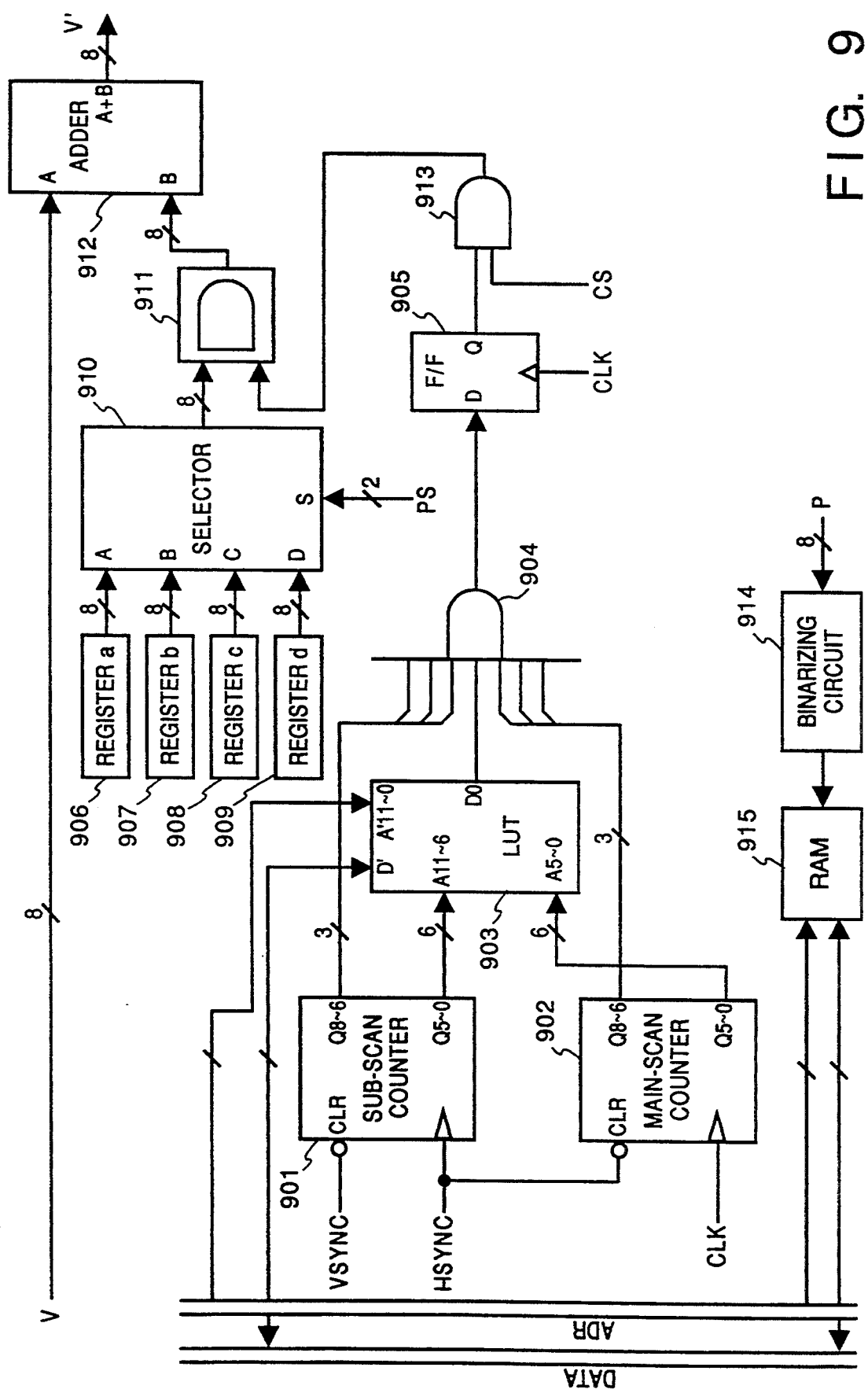
FIG. 9 is a block diagram showing the configuration of a pattern adding circuit in FIG. 2.

FIG. 9 is a block diagram showing the construction of the pattern adding circuit 1410.

In FIG. 9, the pattern adding circuit includes a sub-scan counter 901, a main-scan counter 902 and a LUT 903. The LUT 903 is a non-volatile dual-port RAM or a volatile dual-port RAM backed up by a battery.

Numeral 904 denotes an AND gate, 905 an F/F, 906~909 registers, 910 a four-input/one-output selector, 911, 913 AND gates, and 912 an adder.

Further, numeral 914 denotes a binarizing circuit for binarizing the image signal P outputted by the space filter 1407. The binarizing circuit 914 outputs "1" when the image signal P is greater than a predetermined threshold value and "0" when the image signal P is less than the predetermined threshold value.

Numeral 915 denotes a dual-port RAM for storing the binarized image data outputted by the binarizing circuit 914. In a case where image data is written in the RAM 915, the output-color selecting signal CNO is made "0". This is to arrange it so that the image signal P is formed, in apparent terms, from the G (green) signal outputted by the CCD 1210-1. In other words, since luminance represented by the G signal is closest to the luminance of the actual image, this serves as simple means for representing the luminance of the original image.

The CPU 1411, through the intermediary of a data bus DATA and address bus ADR shown in FIG. 9, reads the data which has been stored in the RAM 915 and writes the same data in the LUT 903, whereby the specific pattern added to the image output is registered in the LUT 903. It should be noted that read-in and registration of a specific pattern are performed by a serviceman in a prescribed servicing mode when the apparatus of this embodiment is installed. In other words, it is so arranged that these operations cannot be carried out by an ordinary individual. By way of example, the specific pattern is registered by reading, by means of the CCD 1201-1, a manufacturer's serial number printed on the bottom side of the platen 2200.

The sub-scan counter 901 repeatedly counts the main-scan synchronizing signal HSYNC at a nine-bit width, namely at a period of 512. Similarly, the main-scan counter 902 counts the pixel synchronizing signal CLK at the nine-bit width or period of 512. The six lower order bits (Q5~Q0) of the count in the main-scan counter 902 are inputted to the address terminals A5~A0 of the LUT 903, and the six lower order bits (Q5~Q0) of the count in the sub-scan counter 901 are inputted to the address terminals A11~A6 of the LUT 903.

The AND gate 904 takes the AND among the three higher order bits (Q8~Q6) of the count in the main-scan counter 901, the three higher order bits (Q8~Q6) of the count in the sub-scan counter 902 and the one-bit output D0 of the LUT 903. The output of the AND gate 904 is synchronized by the pixel synchronizing signal CLK in the F/F 905, and the AND gate 913 takes the AND between the output of the F/F 905 and the added-color designating signal CS. The output of the AND gate 913 is delivered to the AND gate 911. Accordingly, when there is an image output by YMC, the color of the specific pattern can be selected from seven colors depending upon whether added-color designating signal CS is 1 or 0 in each YMC plane.

Eight-bit modulating quantities $\alpha_1 \sim \alpha_4$ having different values are stored in the registers 906~909, respectively. In accordance with the pattern-level selecting signal PS outputted by the CPU 1411, the selector 910 selects any one of the modulating quantities $\alpha_1 \sim \alpha_4$ stored by the registers 906~909 and outputs the selected modulating quantity to the AND gate 911. The modulating quantities are set in accordance with the relation $\alpha_1 < \alpha_2 < \alpha_3 < \alpha_4$, and the selector 910 outputs $\alpha_1$ when PS="00" holds, $\alpha_2$ when PS="01" holds, $\alpha_3$ when PS="10" holds and $\alpha_4$ when PS="11" holds. Though the details will be described below, the CPU 1411 outputs the pattern-level selecting signal PS in dependence upon the decision signal H.

The AND gate 911 takes the AND between the specific-pattern signal received from the AND gate 913 and each bit of the modulating quantity $\alpha$ received from the selector 910, and the adder 912 adds the density-modulated specific-pattern signal, which has been outputted by the AND gate 911, to the image signal V sent from the density converting circuit 1408. The adder 912 outputs an image signal V', which is the result of adding the specific pattern to the image signal V.

Accordingly, the specific pattern registered in the LUT 903 is read out repeatedly, and the specific pattern is added to the image signal V, when the added-color designating signal CS is "1".

In other words, in accordance with this embodiment, the modulating quantity α is varied in dependence upon the possibility that the input image contains a specific original. If the output image is ordinary, a specific pattern is added to the ordinary output image and the density of the pattern is such as to render it almost indistinguishable to the human eye. The greater the possibility that the output image contains a specific original, the higher the density of the specific pattern added to the output image.

In the description given above, the specific pattern represents the manufacturer's serial number, which is peculiar to the apparatus. However, the invention is not limited to this arrangement. The specific pattern can be the manufacturer's serial number in the form of a code or symbols or information capable of specifying the apparatus, such as the manufacturing date, lot number or version of the apparatus.

[Results of Copying]

Figure 10:
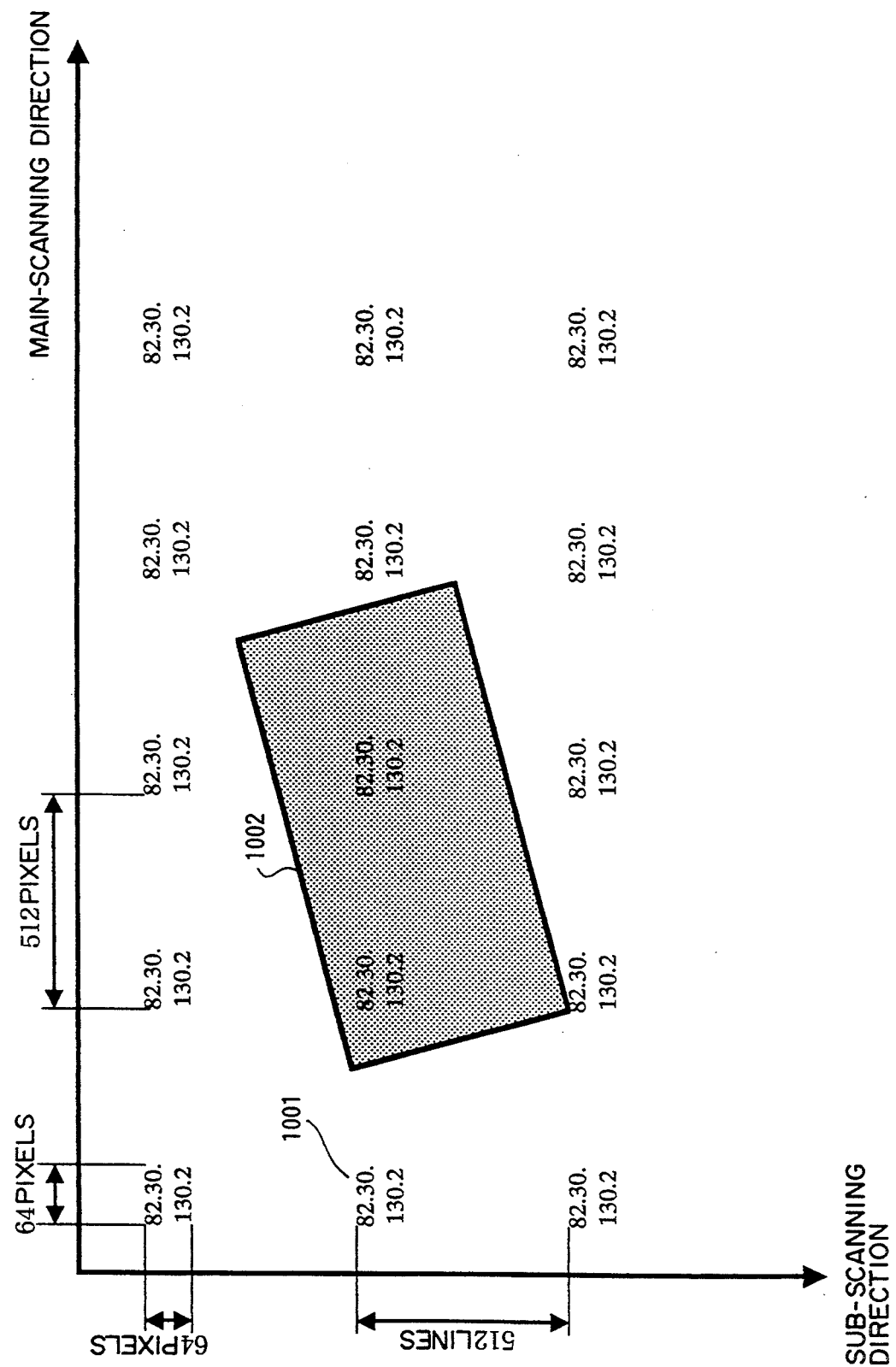
FIG. 10 is a diagram showing an example of an output image according to this embodiment.

FIG. 10 is a diagram illustrating an example of an output image according to this embodiment.

In FIG. 10, numeral 1002 denotes the image of an original, and numeral 1001 denotes a specific pattern. The information that has been registered in the LUT 903 is recorded on the output image of this embodiment. FIG. 10 illustrates an example in which the specific pattern "82.30.130.2" is added on at 64×64 pixels and is repeated every 512 pixels in the main-scanning direction and every 512 lines in the sub-scanning direction. For example, if the image output has a resolution of 400 dpi, 512 pixels and 512 lines correspond to about 32.5 mm, and hence the specific pattern is added on approximately every 32.5 mm. A bank note (a Bank of Japan note) has a length of about 76 mm along its short side, and the short-side lengths of bank notes issued by the major countries also range from 60 mm to 120 mm. This means that if a bank note is an unlawful copy, the specific pattern will always appear somewhere on its surface. Accordingly, if the spacing at which the specific pattern is added on is selected appropriately, the specific pattern will always be printed on a counterfeit bank note even if the portion of the copy that is the counterfeit bank note is cut from the rest of the sheet containing the copy produced by the apparatus of this embodiment.

[Flowchart]

Figure 11:
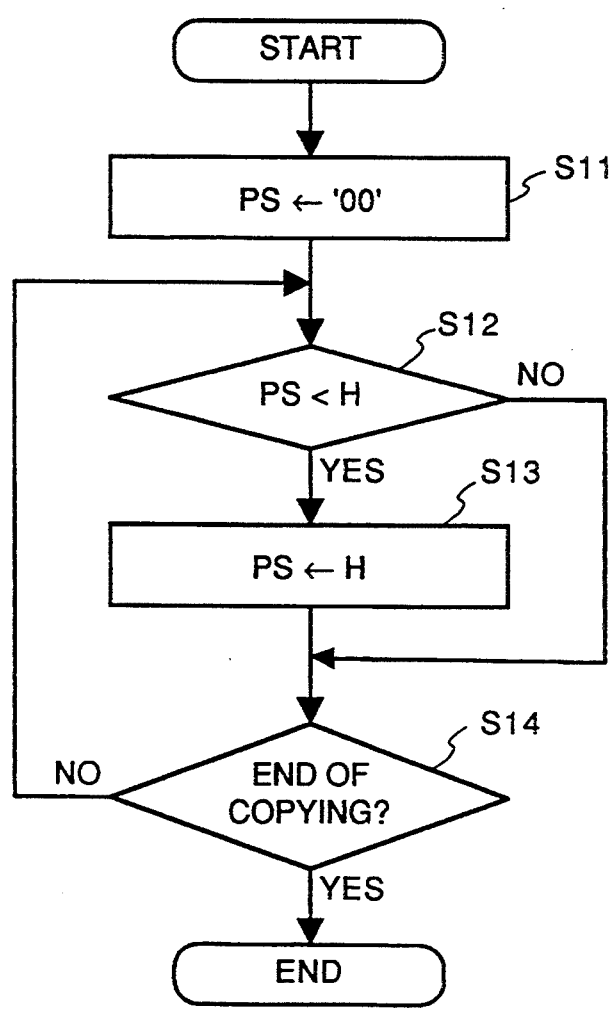
FIG. 11 is a flowchart showing a procedure for setting a pattern-level select signal according to this embodiment.

FIG. 11 is a flowchart for describing a procedure executed by the CPU 1411 for the setting of the pattern-level selecting signal PS. This procedure is executed at the same time that the copying operation states.

Immediately after a copying operation starts, the pattern-level selecting signal PS is initialized to "00" by the CPU 1411 at step S11. Next, the decision signal H and the pattern-level selecting signal PS are compared at step S12. If the result of comparison is PS<H, the pattern-level selecting signal PS is set to the value of the decision H at step S13. IF PS≧H holds, the program jumps to step S14.

Next, the CPU 1411 determines at step S14 whether copying has ended. If copying has ended, then the procedure is terminated. If copying is still in progress, then the program returns to step S14.

The maximum value of the decision signal H from the start of copying to the present time is set as the pattern-level selecting signal PS.

[Added-Color Selecting Signal CS]

In this embodiment, the added-color designating signal CS is outputted in such a manner that printing will be performed in a preset color.

By way of example, yellow is a color that is difficult for the human eye to distinguish. If the specific pattern is printed in yellow (Y), the specific pattern added on to the image output can be made less conspicuous. In this case, the CPU 1411 makes the added-color designating signal CS "1" when the output-color selecting signal CNO is "10".

It should be noted that the color of the specific pattern may be selected beforehand to be an inconspicuous color in dependence upon the coloring characteristics of the toners used in the image output. Also, the signal CS can be generated in accordance with the manual designation from the operation panel 1413.

In this embodiment, the modulating means controls color of the specific pattern in dependence upon the transfer material of the image output means or upon the color of a developing agent.

Thus, in accordance with the embodiment as described above, a number specific to the apparatus, such as the manufacturer's serial number, or the manufacturer's serial number in the form of a code or symbols, can be added to an output image as a specific pattern in a color that is not conspicuous. If an unlawful copy is made, the apparatus used to produce the copy can be ascertained by examining the unlawful copy.

Furthermore, in accordance with the embodiment, the specific pattern is added to an output image that does not contain a specific original in such a manner that the density of the pattern is made almost indistinguishable to the human eye. This makes it possible to minimize deterioration in the picture quality of an ordinary output image. Moreover, in dependence upon the coloring characteristics of the toners used in the image output, the specific pattern can be made one which is identifiable but not conspicuous.

Further, in accordance with this embodiment, the specific pattern is added on repeatedly at intervals that are less than the length of the short side of bank notes or the like. As a result, the specific pattern will always be printed on a specific original even if the portion of the unlawful copy that is the specific original is cut from the copy.

Second Embodiment.

A second embodiment of the invention will now be described. Components in the second embodiment substantially the same as those of the first embodiment are designated by like reference characters and need not be described again.

[Configuration]

Figure 12:
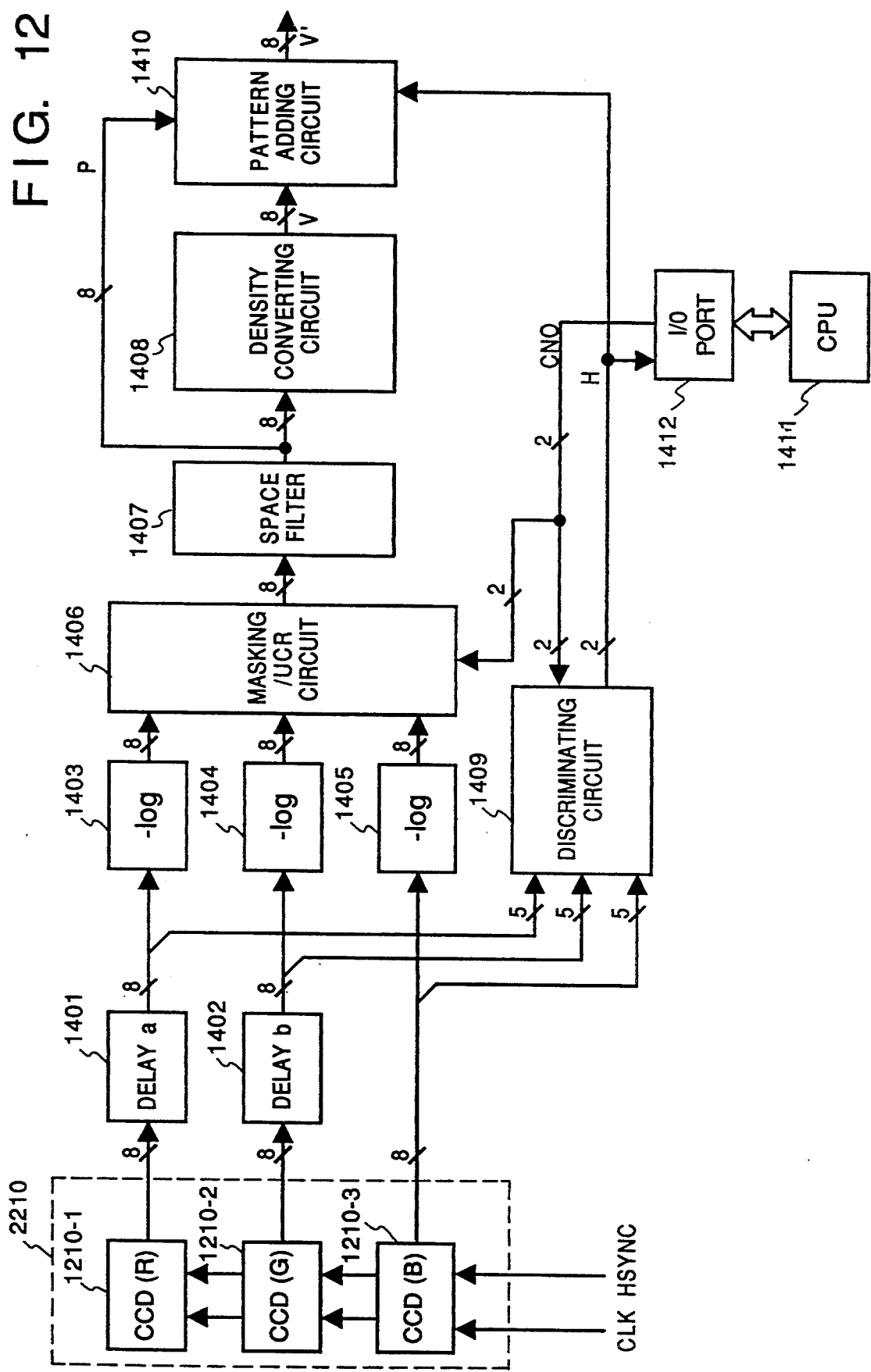
FIG. 12 is a block diagram illustrating the configuration of an image scanner according a second embodiment of the present invention.

FIG. 12 is a block diagram showing the configuration of the image scanner according to the second embodiment.

The difference between the image scanner of the second embodiment shown in FIG. 12 and the image scanner of the first embodiment shown in FIG. 2 is that whereas the I/O port 1412 supplies the pattern adding circuit 1410 with the two-bit pattern-level selecting signal PS and the one-bit added-color designating signal CS in the first embodiment, in this embodiment the discriminating circuit 1409 supplies the pattern adding circuit 1410 solely with the two-bit decision signal H.

Figure 13:
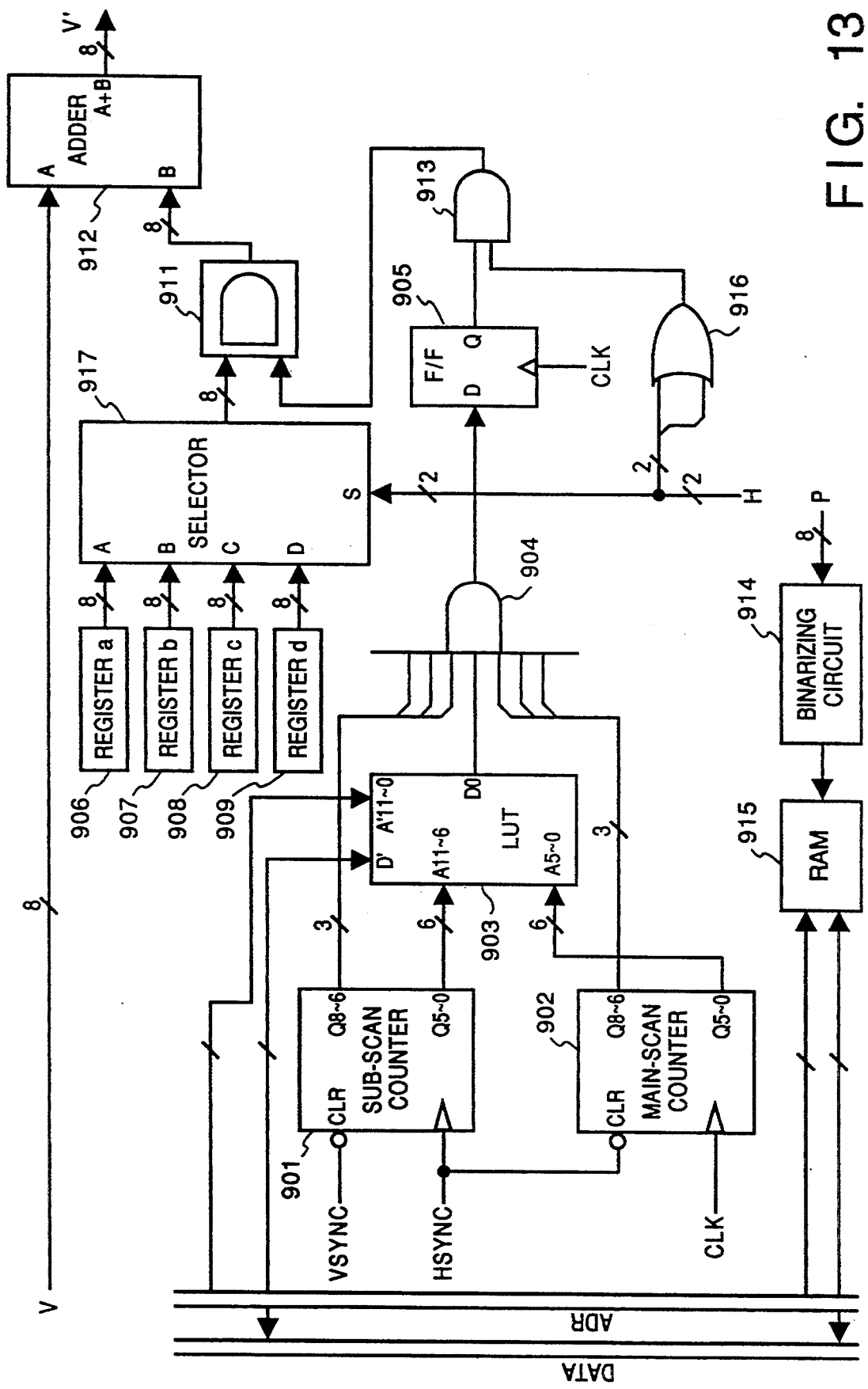
FIG. 13 is a block diagram showing the configuration of a pattern adding circuit in FIG. 12.

FIG. 13 is a block diagram showing the configuration of the pattern adding circuit 1410 according to the second embodiment.

The structural differences between the pattern adding circuit 1410 of the second embodiment shown in FIG. 13 and the pattern adding circuit 1410 of the first embodiment shown in FIG. 9 is that an OR gate 916 for taking the OR of each bit of the decision signal H is added to the second embodiment.

In the second embodiment, the decision signal H is inputted to the select terminal S of the selector 910 so that the modulating quantity α is outputted from the selector 910 in dependence upon the decision signal H. Register a906 is selected when the signal H is "00"; register a907 when the signal H is "01"; register a908 when the signal H is "10"; and register a909 when the signal H is "11".

The bits of the decision signal H are OR-ed by the OR gate 916, and the AND gate 913 takes the AND between the output of OR gate 916 and each bit in turn of the specific-pattern signal from the F/F 905.

Thus, in accordance with the second embodiment as described above, effects similar to those of the first embodiment are obtained. In the first embodiment, however, the modulating quantity α of the specific pattern is in accordance with the pattern-level selecting signal PS for all colors. In the second embodiment, the modulating quantity α of the specific pattern is controlled, for each and every color, by the decision signal H.

Third Embodiment

A third embodiment of the invention will now be described. Components in the third embodiment substantially the same as those of the first embodiment are designated by like reference characters and need not be described again.

[Configuration]

Figure 14:
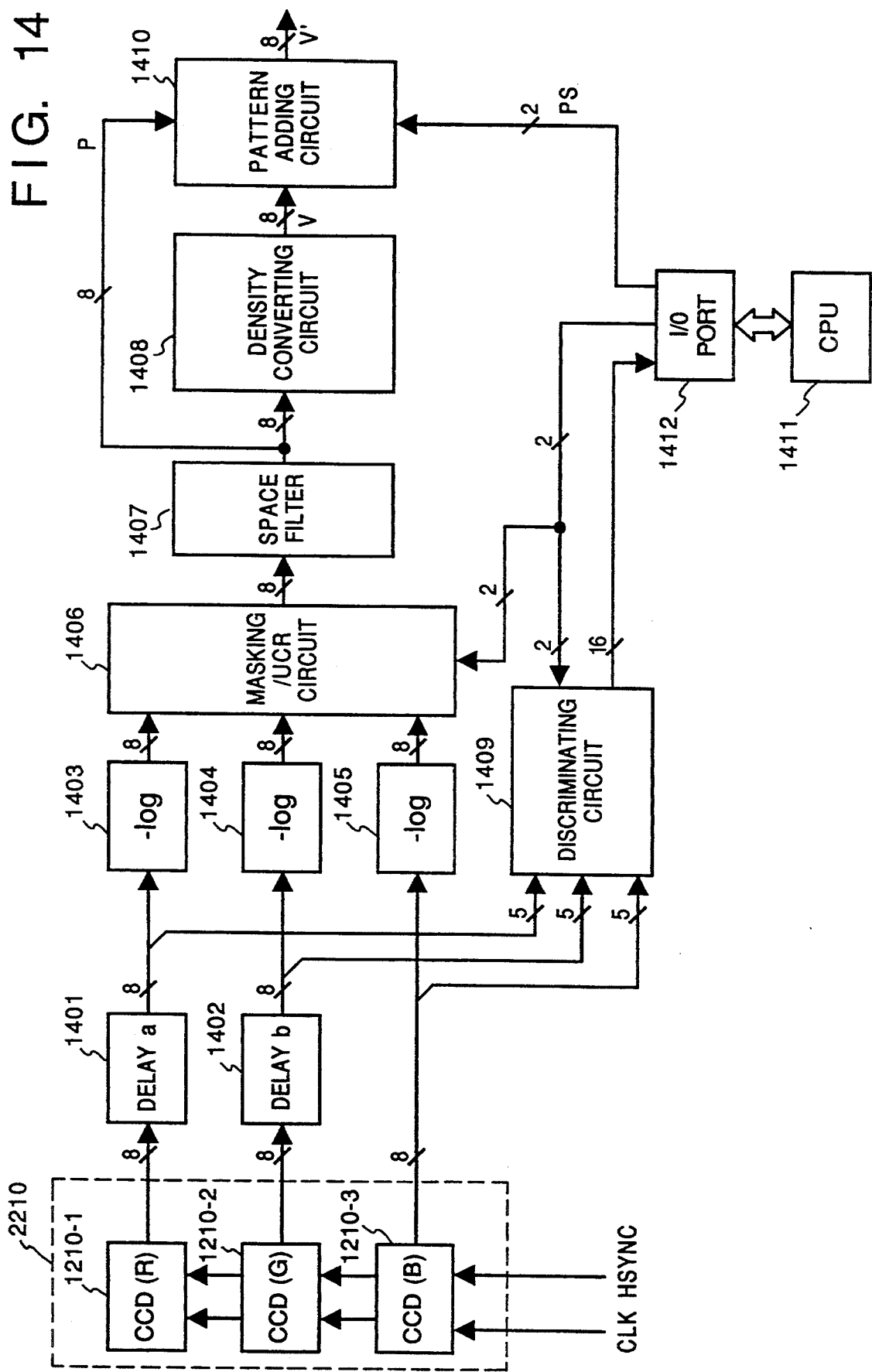
FIG. 14 is a block diagram illustrating the configuration of an image scanner according a third embodiment of the present invention.

FIG. 14 is a block diagram showing the configuration of the image scanner according to the third embodiment.

The differences between the image scanner of the third embodiment shown in FIG. 12 and the image scanner of the first embodiment shown in FIG. 2 are as follows:

1) The signal supplied from the I/O port 1412 to the pattern adding circuit 1410 is solely the two-bit pattern-level selecting signal PS.

2) The signal sent from the discriminating circuit 1409 to the CPU 1411 via the I/O port 1412 is the result (a total of 16 bits) of judging the specific original.

Figure 15:
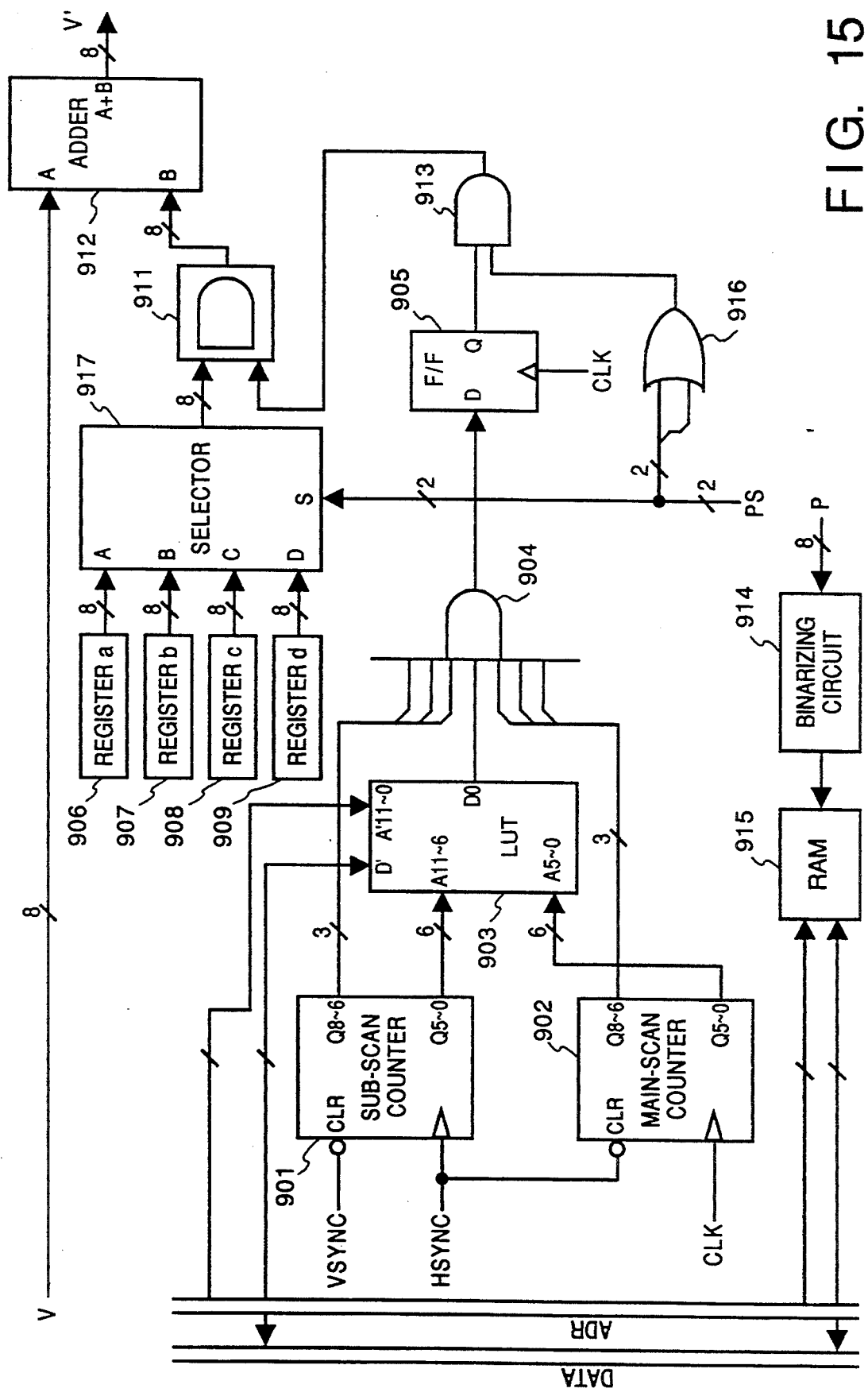
FIG. 15 is a block diagram showing the configuration of a pattern adding circuit in FIG. 14.

FIG. 15 is a block diagram showing the configuration of the pattern adding circuit 1410 according to the third embodiment.

The structural difference between the pattern adding circuit 1410 of the third embodiment shown in FIG. 15 and the pattern adding circuit 1410 of the first embodiment shown in FIG. 9 is the provision of an OR gate 916 that takes the OR of two bits of the pattern-level selecting signal PS.

In FIG. 15, the OR gate takes the OR of two bits of the pattern-level selecting signal PS, and the AND gate 913 takes the AND between the output of the OR gate 916 and each bit of the specific-pattern signal from the F/F 905.

Accordingly, if the pattern-level selecting signal PS is "00", the specific pattern is not printed. If the signal PS has a value other than "00", a specific pattern conforming to the modulating quantity α is printed. As a result, a specific pattern can be added to the image output in a color conforming to the results of judgment from the color-shade judging circuits 1310-1 through 1303-8.

In this embodiment, the register a906 shown in FIG. 15 can be eliminated. If the register a906 is eliminated, the input terminal A of the selector 910 is pulled down to ground level in advance.

Figure 16:
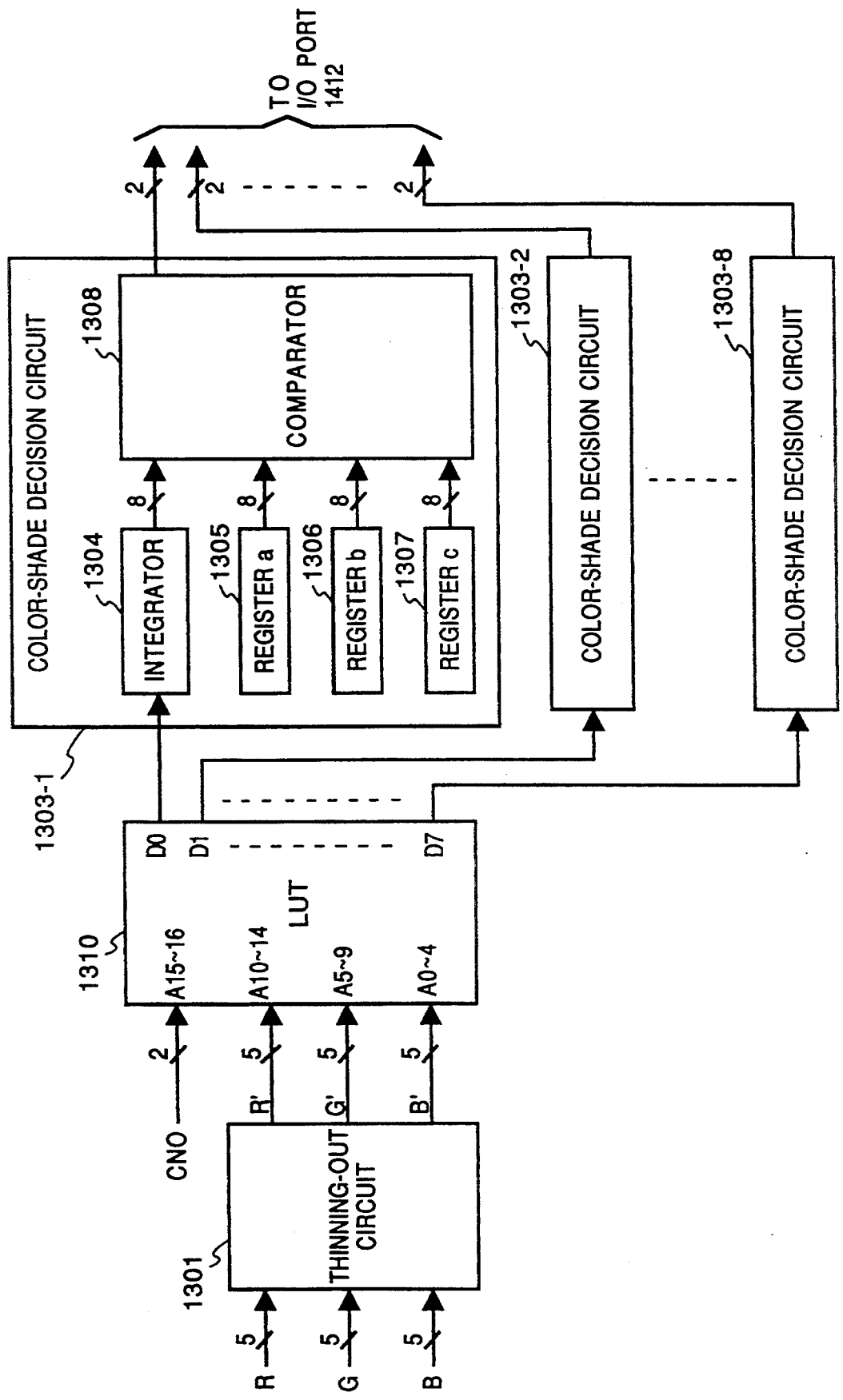
FIG. 16 is a block diagram showing the configuration of a discriminating circuit in FIG. 14.

FIG. 16 is a block diagram showing the configuration of the discriminating circuit 1409 according to this embodiment. In this embodiment, it is determined to which specific original the original 2204 on the glass platform 2203 is closely similar, and an added color conforming to the color shade of this specific original is decided in the CPU 1411 in dependence upon the determination. Therefore, the outputs of the color-shade judging circuits 1310-1 through 1303-8 are sent as they are to the CPU 1411 via the I/O port 1412. Further, it is determined which output from the color-shade judging circuits 1310-1 through 1303-8 is largest, an added color conforming to this color shade is decided in the CPU 1411, and the pattern-level selecting signal PS is outputted accordingly.

It should be noted that an arrangement may be adopted in which, say, the background color of the original is detected and the pattern-level selecting signal PS is decided in conformity with the background color. Alternatively, the chromaticity of the original or the distribution of hues may be detected by a histogram and the pattern-level selecting signal PS may be deciding in conformity with the histogram.

Figure 17:
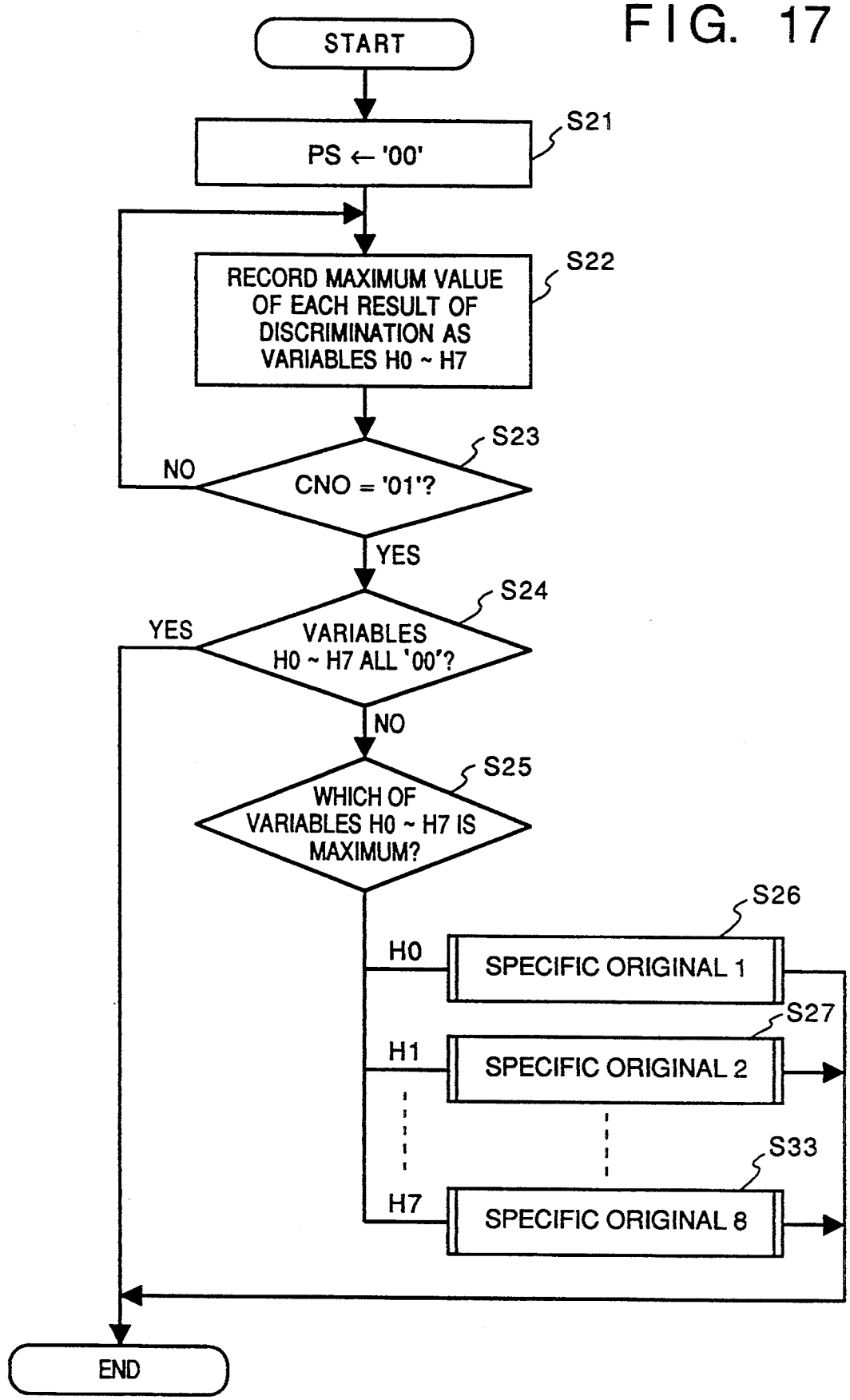
FIG. 17 is a flowchart showing a procedure for setting a pattern-level select signal according to the third embodiment.

FIG. 17 is a flowchart showing a procedure executed by the CPU 1411 to set the pattern-level select signal according to the third embodiment. This procedure is executed at the same time that copying starts.

When a copying operation starts, the pattern-level selecting signal PS is initialized to "00" by the CPU 1411 at step S21.

Next, at steps S22 and S23, the CPU 1411 records each result of discrimination inputted from the discriminating circuit 1409, namely each maximum value of the outputs from the color-shade judging circuits 1310-1 through 1303-8, as a corresponding one of variables H0~H7 until the output-color selecting signal CN0 becomes "01".

Next, at step $24, the CPU 1411 terminates the procedure if all of the variables H0~H7 are "00". If all of these variables are not "00", the program proceeds to step S25, at which processing branches in conformity with which of the variables H0~H7 is maximum. That is, the program proceeds to step S26 if variable H0 is maximum, to step S27 if variable H1 is maximum, ..., and to step S33 if variable H7 is maximum. The CPU 1411 executes processing conforming to which of the outputs of the color-shade judging circuits 1310-1 through 1303-8 is maximum. If a plurality of the variables have the same value, branching is performed in a preset order of priority (e.g., H0, H1, ..., H7). Further, the CPU 1411 terminates the procedure when the above-mentioned steps end.

Figure 18:
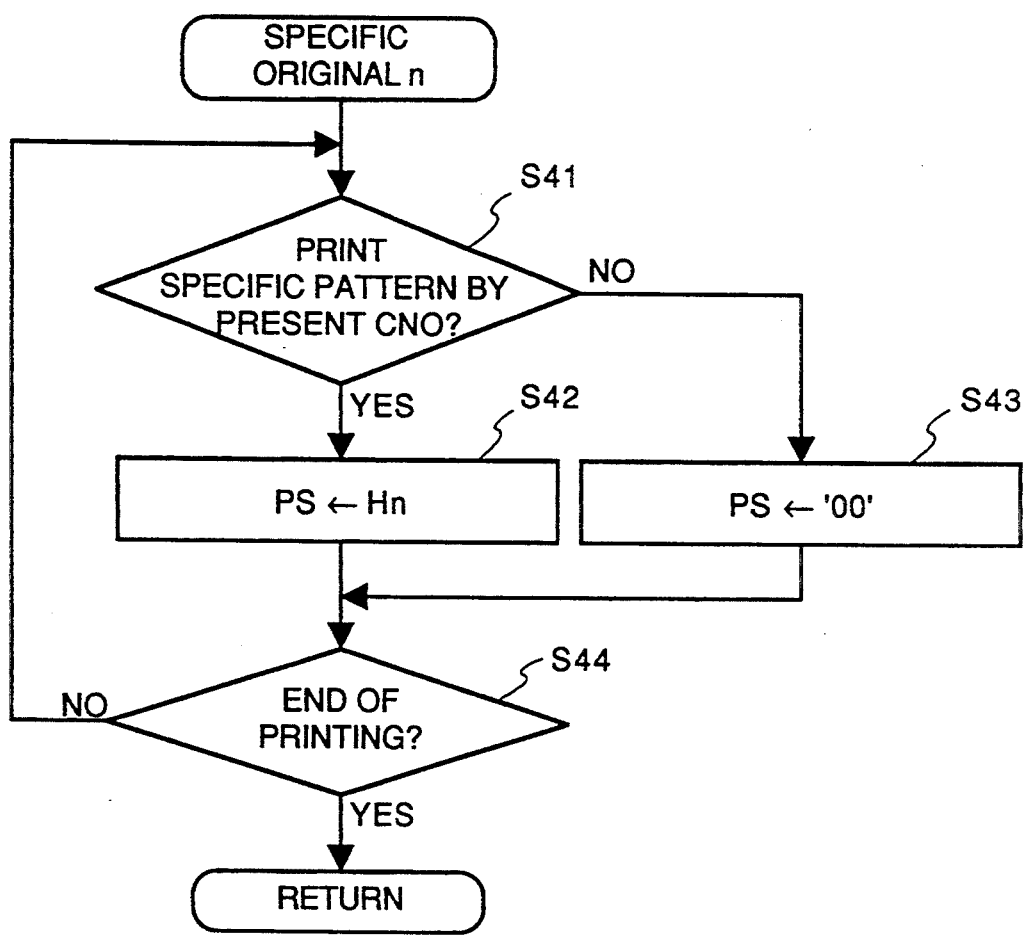
FIG. 18 is a flowchart showing the details of steps S26~S33 in FIG. 17.

FIG. 18 is a flowchart showing the details of steps S26~S33 in FIG. 17.

At step S41 in FIG. 18, the CPU 1411 determines whether a specific pattern will be outputted by the presently prevailing output-color selecting signal CNO based upon information indicating the relationship between a preset specific original and the printed color of a specific pattern. If a specific pattern is outputted, then the pattern-level selecting signal PS is set to the value of a variable Hn (n=0, 1, ..., 7) at step S42. If a specific pattern is not outputted, the pattern-level selecting signal PS is set to "00" at step S43.

Next, at step S44, the CPU 1411 determines whether printing has ended. The program returns to the procedure of FIG. 17 if printing has ended and returns to step S41 if printing has not ended.

More specifically, in the third embodiment, a specific pattern having a color conforming to the color shade of the original is added to the image output. If the original image does not contain a specific original, a specific pattern is not added to the image output.

Thus, in accordance with the third embodiment as described above, effects substantially the same as those of the first embodiment are obtained. Moreover, a specific pattern having a color conforming to the shading of the original can be added to the image output. As a result, a specific pattern can be made less conspicuous depending upon the original, and a specific pattern can be added in a color that is more easily distinguishable depending upon the specific original. Furthermore, processing can be executed in which an output image not containing a specific original is not provided with a specific pattern.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
    input means for inputting an image signal;
    generating means for generating a specific pattern;
    adding means for adding the specific pattern generated by said generating means to an image represented by the image signal; and
    control means for generating a control signal for selecting a color of the specific pattern,
    wherein the specific pattern relates to information for identifying said image processing apparatus with which the image signal is processed.

2. The apparatus according to claim 1, further comprising discriminating means for discriminating a degree of similarity between an image represented by the image signal inputted by said input means and a predetermined specific image.

3. The apparatus according to claim 2, wherein said adding means adds the specific pattern to the image in a color conforming to the results of discrimination performed by said discriminating means.

4. The apparatus according to claim 3, wherein said adding means decides the color in dependence upon a color shade of a specific original having maximum degree of similarity discriminated by said discriminating means from among a plurality of specific originals.

5. The apparatus according to claim 2, wherein said adding means adds the specific pattern to the image in a density, or luminance, and color conforming to the results of discrimination performed by said discriminating means.

6. The apparatus according to claim 5, wherein said adding means increases the density or luminance in proportion to the degree of similarity discriminated by said discriminating means.

7. The apparatus according to claim 1, wherein the specific pattern contains a number or a symbol specific to the apparatus.

8. The apparatus according to claim 1, wherein the specific pattern contains a manufacturing date of the apparatus.

9. The apparatus according to claim 1, wherein the specific pattern is added on repeatedly at a fixed interval.

10. The apparatus according to claim 9, wherein the fixed interval is smaller than longitudinal and transverse dimensions of the specific original.

11. An image processing apparatus having image reading means for optically reading an original and obtaining a color-separated full-color image signal, and output means for outputting an image represented by the image signal, the apparatus comprising:
    discriminating means for discriminating degree of similarity between an image represented by the image signal outputted by said reading means and a predetermined specific image;
    memory means for storing a specific pattern;
    modulating means for modulating the specific pattern, which has been stored in said memory means, in dependence upon results of discrimination performed by said discriminating means; and
    adding means for adding the specific pattern, which has been modulated by said modulating means, to the image signal.

12. The apparatus according to claim 11, wherein said modulating means controls density or luminance of the specific pattern in dependence upon results of discrimination performed by said discriminating means.

13. The apparatus according to claim 12, wherein said modulating means increases the density or luminance in proportion to the degree of similarity discriminated by said discriminating means.

14. The apparatus according to claim 11, wherein said modulating means decides color of the specific pattern in dependence upon a transfer material or developing agent of said output means.

15. The apparatus according to claim 11, wherein the specific pattern contains a number or a symbol specific to the apparatus.

16. The apparatus according to claim 11, wherein the specific pattern contains a manufacturing date of the apparatus.

17. The apparatus according to claim 11, wherein the specific pattern is added on repeatedly at a fixed interval.

18. The apparatus according to claim 17, wherein the fixed interval is smaller than longitudinal and transverse dimensions of the specific original.

19. An image processing method comprising the steps of:
    inputting an image signal;
    generating a specific pattern;
    adding the specific pattern generated in said generating step to an image represented by the image signal; and
    generating a control signal for selecting a color of the specific pattern,
    wherein the specific pattern relates to information for identifying an apparatus, with which the image signal is processed.

* * * * *

UNITED STATES PATENT AND TRADEMARK OFFICE
CERTIFICATE OF CORRECTION

PATENT NO. : 5,418,602
DATED : May 23, 1995
INVENTOR(S) : Eiichi Nishikawa

It is certified that error appears in the above-indentified patent and that said Letters Patent is hereby corrected as shown below:

COLUMN 3

Line 2, "according" should read --according to--.

COLUMN 6

Line 7, "response" should read --response to--.

COLUMN 9

Line 58, "states." should read --starts.--

COLUMN 12

Line 47, "$24," should read --S24,--

Signed and Sealed this

Tenth Day of October, 1995

Attest:

BRUCE LEHMAN

*Attesting Officer*      *Commissioner of Patents and Trademarks*